(12) United States Patent
Relin

(10) Patent No.: US 7,556,455 B2
(45) Date of Patent: Jul. 7, 2009

(54) METHOD OF DYNAMIC TRANSPORTING OF OBJECT WITH FLOW OF CARRYING MEDIUM

(75) Inventor: Arkadi Relin, Langhorne, PA (US)

(73) Assignee: Remco International, Ink, Huntington Valley, PA (US)

( * ) Notice: Subject to any disclaimer, the term of this patent is extended or adjusted under 35 U.S.C. 154(b) by 408 days.

(21) Appl. No.: 10/581,653

(22) PCT Filed: Nov. 26, 2004

(86) PCT No.: PCT/US2004/039818

§ 371 (c)(1),
(2), (4) Date: Jun. 1, 2006

(87) PCT Pub. No.: WO2005/065099

PCT Pub. Date: Jul. 21, 2005

(65) Prior Publication Data

US 2008/0089747 A1    Apr. 17, 2008

Related U.S. Application Data

(63) Continuation of application No. 10/746,195, filed on Dec. 27, 2003, now Pat. No. 6,827,528.

(51) Int. Cl.
*B65G 53/66* (2006.01)

(52) U.S. Cl. .................................................. 406/12
(58) Field of Classification Search ............... 406/12, 406/14, 73, 106, 197, 100, 85; 417/306
See application file for complete search history.

(56) References Cited

U.S. PATENT DOCUMENTS

| | | | | |
|---|---|---|---|---|
| 4,251,365 A | * | 2/1981 | Speece | 261/121.1 |
| 4,334,370 A | * | 6/1982 | Holzenberger | 406/14 |
| 5,048,761 A | * | 9/1991 | Kim | 241/19 |
| 5,201,877 A | * | 4/1993 | Relin et al. | 406/85 |
| 5,593,252 A | * | 1/1997 | Relin et al. | 406/85 |
| 5,865,568 A | * | 2/1999 | Relin et al. | 406/85 |
| 6,447,215 B1 | * | 9/2002 | Wellmar | 406/11 |

* cited by examiner

*Primary Examiner*—Gene Crawford
*Assistant Examiner*—William R Harp
(74) *Attorney, Agent, or Firm*—I. Zborovsky

(57) ABSTRACT

In a method of the energy-saving dynamic transporting of object with a flow of a carrying medium, action are applied to the carrying medium which are created in an action element during a process of conversion of an energy supplied to it, so that the flow of a carrying medium created thereby acts on the object for performing a process of its transporting in a given direction, and a modulation of a value of the action is performed in the action element sq. that the, flow of the carrying medium which is dynamically created moves with a given dynamic periodically changing sign-alternating acceleration during the process of transporting of the object.

21 Claims, 3 Drawing Sheets

METHOD OF DYNAMIC TRANSPORTING OF OBJECT WITH FLOW OF CARRYING MEDIUM

This application is a National Stage Entry under 35 U.S.C. 371 of International Application No. PCT/US04/39818, filed Nov. 26, 2004, which is a continuation application of U.S. nonprovisional application Ser. No. 10/746,195, filed Dec. 27, 2003.

TECHNICAL FIELD

The present invention relates to methods and devices which provide transporting of an object with a flow of a carrying medium. It encompasses a broad class of various systems which are used, for example: in industry; in energy-related systems; in pipelines, ground, air, abovewater, underwater, and other types of transportation; in medical and household technique; in converting and special technique; in special destructive and explosive technique; in research devices and systems; in physiological systems and in other areas. In the present time the broad class of such systems under consideration represents one of important developing areas in the world, characterized with significant energy consumption.

BACKGROUND ART

Various methods and devices are known, which provide transporting of objects with a flow of a carrying medium. A common traditional methodological approach which is used in various systems in the above mentioned class is application of an action to the above mentioned carrying medium from an action means which creates during the process of conversion of the energy supplied to it, and integrally constant in time action so that the above mentioned flow of the carrying medium created in this way acts on the above mentioned object for providing the process of its transporting in a given direction. This approach is realized in various systems which use mainly two types of means for action: means of pressure drop (pumps; screw, turbine, turbo reactive and reactive systems; explosive devices of pumping or vacuum action; means of action which use a forced aerodynamic or hydrodynamic interaction of the object or its structural part, correspondingly with gaseous or liquid medium, for example a region of an outer surface of a casing of a flying, speedy ground or underwater moving apparatus, etc.), and means for direct energy action (magnetohydrodynamic pumps; magnetic and electromagnetic acceleration systems, etc.). The object can be structurally not connected or structurally connected (for example in a flying apparatus) with the action means. In some cases the object, being a flowable medium, performs a function of the carrying medium (for example gas or liquid product such as oil transported in a pipeline). In various known action means, energy which is supplied to them and is converted in them can be of various types, such as for example: electrical, electromagnetic, magnetic, mechanical, thermal energy; energy generated for example as a result of performing correspondingly: a chemical reaction, a nuclear reaction, a laser action, etc., or for example energy generated during operation of a physiological system; or generated during a forced aerodynamic interaction of an object with a gaseous medium or during a forced hydrodynamic interaction of an object with a liquid medium. In some known action means, as the supplied energy a combination of several different types of supplied energy is utilized (for example, a combination of magnetic and electrical energy as in a magnetohydrodynamic pump). As the carrying medium, mainly a flowing (gaseous or liquid) medium is utilized. The object of transportation can be for example: powder or granular material; gaseous or liquid medium; excavated product (coal, ore, oil, gas, gravel, etc.); a mixture of materials and media; a component or refuse of manufacturing process; fast movable or immovable objects; physiological or physical substance; and many others.

Common disadvantages of the known traditional methodological approach which is realized in such systems for providing a process of transporting an object with a flow of a carrying medium are as follows:

limited possibilities for reduction of specific consumption of energy for providing the process of transporting of the objects;

impossibility of performing efficient dynamic control of the process of transporting, with the purpose of optimization of its energy characteristics;

presence of negative side effects which accompany work of some of such systems and significantly worsen their operational and energy characteristics (for example "sticking" during suction; adhesion of particles on inner walls or clogging of a portion of a channel which limits the transported flow; a fast clogging of filtering devices which operate in a multi-phase flow; and so on).

The above listed disadvantages significantly reduce energy, and therefore also economical efficiency of application of such traditional systems for providing the process of transporting an object unit by a flow of a carrying medium.

Other methods and devices for such transporting of an object with a flow of a carrying medium are known, as disclosed for example in U.S. Pat. Nos. 5,201,877 (1993); 5,593,252 (1997); and 5,865,568 (1999)—A. Relin, et al. The above-mentioned methods and devices realize a methodological approach which was first proposed by Dr. A. Relin in 1990 and utilizes a modulation of the suction force, performed outside of the action means by connection of an inner cavity of the suction area of the transporting line with atmosphere through a throughgoing passage and simultaneous periodic change of an area and shape of the throughgoing passage during transporting of the object. The use of this approach (which is named by Dr. A. Relin "AM-method"), which realizes the "principle of controlled exterior dynamic shunting" of the suction portion proposed by the author opens qualitatively new possibilities for significant increase of efficiency of operation and exploitation of a certain class of devices and systems for suction transporting of various objects. In particular, the use of modulation of the suction force over a limited suction portion of movement of the flow in a closed passage, for example in vacuum cleaning systems, in various medical suction instruments, and also in pneumotransporting systems of various materials and objects allows to minimize and even completely eliminate the above mentioned common disadvantages which are inherent to known traditional approach realized in the known systems of this type.

However, the necessity and possibility of performing the connection of the interior cavity of only the suction portion of the transporting line (outside of the above mentioned action means) with the atmosphere through the throughgoing passage does not allow to use this principle of modulation in a sufficiently broad class of other types of known devices and systems which can provide a process of transporting an object with the flow of carrying medium:

which do not allow a contact with atmospheric medium of the object transported in the closed passage, for example various gasses, chemical and physiological materials and media;

which do not allow an entraining of atmospheric medium (for example air) into the hydrotransporting system which can lead to cavitation effects are damaging for the pipeline and the hydraulic pump, and also to energy losses in the process of transporting an object with a flow of a carrying medium;

which do not allow a possibility of performing the connection of the inner cavity of the pumping line of transportation with atmosphere through the throughgoing passage, causing expelling of the transporting medium into atmosphere;

which provide identical speed characteristics over the whole extension of the movable flow: both at its suction portion and its pumping portion;

which do not allow a possibility of realization of such approach due to absence of a closed long suction portion of the passage during the use of various types of above mentioned action means on the carrying medium with a pressure drop, for example: connected with the object of transporting—screw, turbine, turbo reactive and reactive systems; various explosive devices; action means which use forced aerodynamic and hydrodynamic action of the object, correspondingly, with gaseous and liquid medium; and other similar types of action means;

which do not provide a pressure drop with the action means used in them, realizing other principles of performing of the above mentioned action, for example during the use of the above mentioned means of direct energy action.

In addition, during the development of the construction of the modulator which realizes the above mentioned "principle of controlled exterior dynamic shunting" of the suction portion it is necessary to solve additional problems, for example: connected with a reduction of the level of additional noise effect caused during a periodic connection of the atmospheric medium with the internal cavity of the suction portion of the transporting line; and also effects connected with protection of the throughgoing passage of connection of the modulator from possible sucking into it of various components of an exterior medium or foreign objects.

The attempts to take into consideration these factors in such cases additionally complicates and makes more expensive the construction and the operation of the modulator.

The above explained disadvantages significantly limit the possibilities during solution of real problems connected with energy optimization of processes of transporting of an object with a flow of a carrying medium, and also areas of application of the above analyzed efficient methodological approach which use the modulation of the suction force over the suction portion, performed with the use of the above mentioned "Principle of controlled exterior dynamic shunting".

SUMMARY OF THE INVENTION

Accordingly, it is an object of the present invention to provide a method of dynamic transporting of an object with a flow of a carrying medium which is in principle new.

The proposed method (which is named by the inventor "R-method") is based on works of Dr. A. Relin and confirmed by scientific research of concepts of a new theory "Modulating aero- and hydrodynamics of processes of transporting objects with a flow of a carrying medium". This scientific concepts consider new laws which are developed by the author and connected with a significant reduction of a complex of various known components of energy losses (and therefore of specific consumption of energy) during creation of a dynamically controlled process of movement of the flow of a carrying medium with a given dynamic periodically changing sign-alternating acceleration during the process of transporting of the above mentioned object.

The proposed method minimizes or completely eliminates the above mentioned disadvantages in providing an efficient process of transporting of an object with a flow of a carrying medium which are inherent to the known traditional methodological approach and the above mentioned second approach which uses the modulation of suction force based on the "Principle of controlled exterior dynamic shunting" of the suction portion. High energy efficiency of the new method is obtained due to the fact that it solves a few main problems:

it provides minimization of negative dominating influence of turbulence on losses of kinetic component of the applied energy in a zone of a border layer and in a nucleus of the flow of carrying medium during providing the process of transporting of an object;

it provides minimization of various components of energy losses connected with the process of transporting of the object itself by the flow of carrying medium during whole period of this process;

it provides possibility of a given multi-parameter dynamic control of the process of transporting of an object with a flow of carrying medium during its whole realization;

it provides possibility of significant reduction of integral value of energy action applied to the above mentioned flow and as a result, provides practically analogous significant reduction of consumption of the supplied energy which is converted (consumed) by the action means to the flow;

it provides possibility of dynamic consideration of characteristics (criteria) of the process of transporting of an object with the flow of carrying medium for optimization of the given multi-parameter dynamic control by executing this process with the purpose of increasing of its energy efficiency.

In keeping with these objects and with others which will become apparent hereinafter, one of the new features of the present invention resides, briefly stated, in a method of transporting of an object with a flow carrying medium, which includes the following steps:

application to the above mentioned carrying medium of an action which is created in an action means during a process of conversion of an energy applied to it so that the above mentioned flow of carrying medium created this way acts on the above mentioned object for providing the process of its transporting in a given direction; and performing a given modulation of a value of said action in said action means, which provides a given dynamic periodic change of said value of said action on said carrying medium so that said flow of carrying medium which is dynamically created moves with a given dynamic periodically changing sign-alternating acceleration in a process of said providing the process of transporting of said object.

As the above mentioned action means, either a means of pressure drop or a means of direct energy action can be utilized. The proposed method embraces all possible spacial conditions of the transporting object. In some cases the object can be a flowable medium and in this case can perform a function of the above mentioned carrying medium. In other cases the object can be structurally not connected or structurally connected with the action means in the process of its transporting. In certain situations the structural part of the object can perform the function of a converting element of the action means so as to provide the process of conversion of energy supplied to it and generated during forced interaction of this structural part of the object with the flowable medium.

Another important feature of the present invention is that the above mentioned given modulation of the value of the action in the action means is performed by providing a given dynamic periodic change of the value of a parameter which is dynamically connected with the process of conversion of the action means of the energy supplied to it into the action with simultaneous given change of the value of this parameter in each period of its change during the process of transporting of the object. This approach can be used both in the case of utilization of the pressure drop action means and in the case of utilization of the direct energy action means.

As the parameter of the process of conversion of the supplied energy the following can be utilized, for example: electrical, electromagnetic, magnetic, structural, technical, physical, chemical or physico-chemical parameter; or a combination of various types of these parameters can be utilized. As the energy supplied to the action means, the following energy for example can be used: electrical, electromagnetic, magnetic, mechanical, thermal energy; energy generated as a result of performing of chemical or nuclear reaction; energy generated during the operation of a physical system; energy of forced aerodynamic interaction of a structural part of the object with a gaseous medium (performing the function of the action means); energy of forced hydrodynamic interaction of the structural part of the object with liquid medium (performing the function of the action means); or it can use a combination of several types of the supplied energy.

In accordance with another feature of the present invention, the given modulation of the value of the action in the pressure drop means is performed by providing a simultaneous given dynamic periodic change in working zones of the pressure drop means, correspondingly, of a value of a negative over pressure and a value of a positive over pressure with a simultaneous their change in each period of the change of the above mentioned values of the above mentioned actions, generated in the process of conversion of the energy supplied to the pressure drop means in the work zones which are in contact with the carrying medium, so as to provide application of the generated given dynamic periodic action determined by the above mentioned values of the negative and positive over pressures during the process of transporting of the object.

The simultaneous given dynamic periodic change in the working zones of the pressure drop means, and correspondingly of the value of negative over pressure and the value of positive over pressure with simultaneous their change in each period of the change of the values of the pressures is performed by a given dynamic periodic change of the value of connection between the working zones with a simultaneous given change of the value of the connection in each its period during the process of transporting of the object.

At the same time the given dynamic periodic change of the value of connection of the working zone with the simultaneous given change of the value of the connection in each its period is performed by a given dynamic periodic generation on a portion of a border of separation between the working zone of a throughgoing passage (or several passages) with a simultaneous given change of the value of a given area of a minimal cross-section of the passage (or several passages) in each period of the generation, accompanied by performing correspondingly of a given dynamic periodic local destruction and subsequent reconstruction of the portion of the border with a simultaneous given change of the value of area of its local destruction in each period during the process of transporting of the object. The above mentioned local destruction is performed by destruction means, for example: technical, physical, chemical, physico-chemical; or is performed by a combination of several types of the destruction means. The portion of the border of separation between the working zones can be identified either structurally or spatially.

In some cases of utilization of the new method, in a process of the given dynamic periodic generation on a portion of the border of separation between the working zones of the throughgoing passage (or several passages) with simultaneous given change of the value of the given area of a minimal throughgoing cross-section of the passage (or several passages) in each period of its action, a filtration of local volume of the carrying medium which in a zone of the given throughgoing passage during the process of the transporting of the object is performed.

The above mentioned new features of the present invention reflect a new "Principle of controlled interior dynamic shunting" of working zones of the pressure drop means.

In accordance with the important features of the present invention, in the method for performing the given modulation of the value of the action in the action means, values of its parameters are given: frequency, range and law of dynamic periodic change of the value of the action during the process of transporting of the object.

A new method makes possible a realization of one of several main variants of giving of the values of the parameters:

the given values of parameters of modulation do not change during the process of transporting;

the values of one (or several) of the given parameters of the modulation is or are changed in a given dependency from changes of a controlled characteristic connected with the process of transporting of the object;

values of the changing parameters of the given modulation are changed in a given dependency from changes of a combination of several types of the control characteristics connected with the process of transporting of the object.

The process provides a possibility to use as the control characteristic, without any limitation, for example as follows:

value of one of the parameters of the process of transporting of the object (energy, consumption, optimized specific consumption energy or speed parameter);

values of one of parameters of the transporting object (speed, consumption, aerodynamic, hydrodynamic, structural, physical, amplitude-frequency, chemical or geometric parameter);

values of one of parameters of spacial position of the object during the process of transporting;

values of one of parameters of a surface of a position of the object during the process of transporting (for example physico-mechanical);

values of one of parameters of the flow of the carrying medium during the process of transporting of the object (for example speed, structural, physical or chemical parameter);

values of one of parameters of a turbulent process in the flow of carrying medium during the process of transporting of the object (for example amplitude, frequency or energy parameter);

value of one of parameters of a process of conversion of energy of movement of the flow of carrying medium into another type of energy (during interaction or without interaction with an additional source of energy, which acts on the flow) during the process of transporting of the object.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
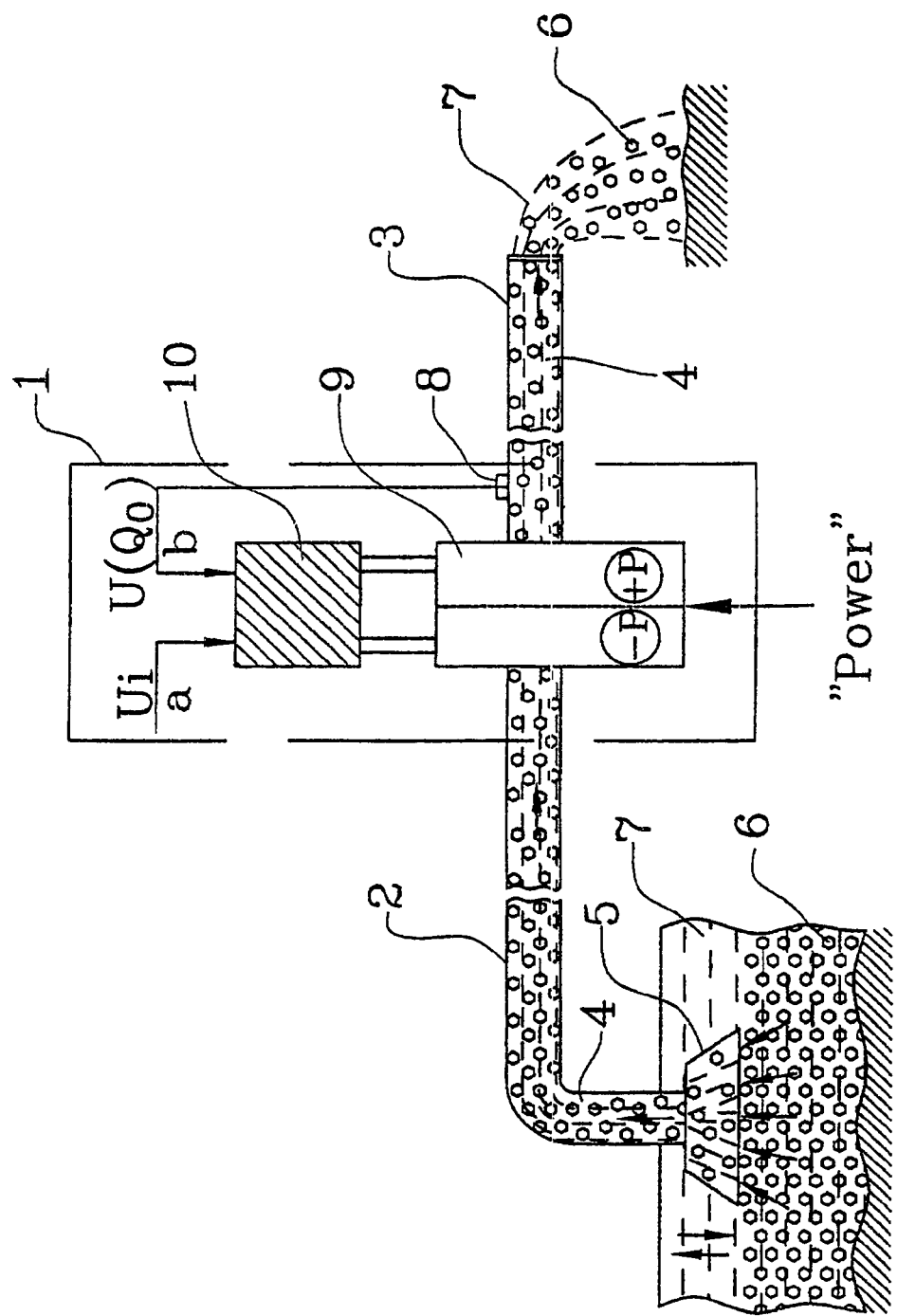
FIG. 1 is a view showing a diagram of a functional structure of a system of a pipeline transportation, with an example of a dynamic pumping hydrotransportation, which realizes a method of dynamic transporting of an object with a flow of carrying medium in accordance with the invention.

A new method of dynamic transporting of object with a flow of carrying medium can be realized in the following way. A typical structure of a system of a pipeline transportation (with an example of a dynamic pumping hydrotransportation) is presented in FIG. 1 and in general includes a controlled dynamic action means (in this example it is a controlled dynamic hydropump) 1, a suction portion 2, and a pumping portion 3 of a hydrotransporting line with an inner cavity 4 and a suction inlet 5, a transporting object, for example gravel 6, a carrying medium (for example water) 7, a sensor 8 which controls a characteristic connected with providing a process of transporting of the object 6 by the carrying medium 7.

Figure 2:
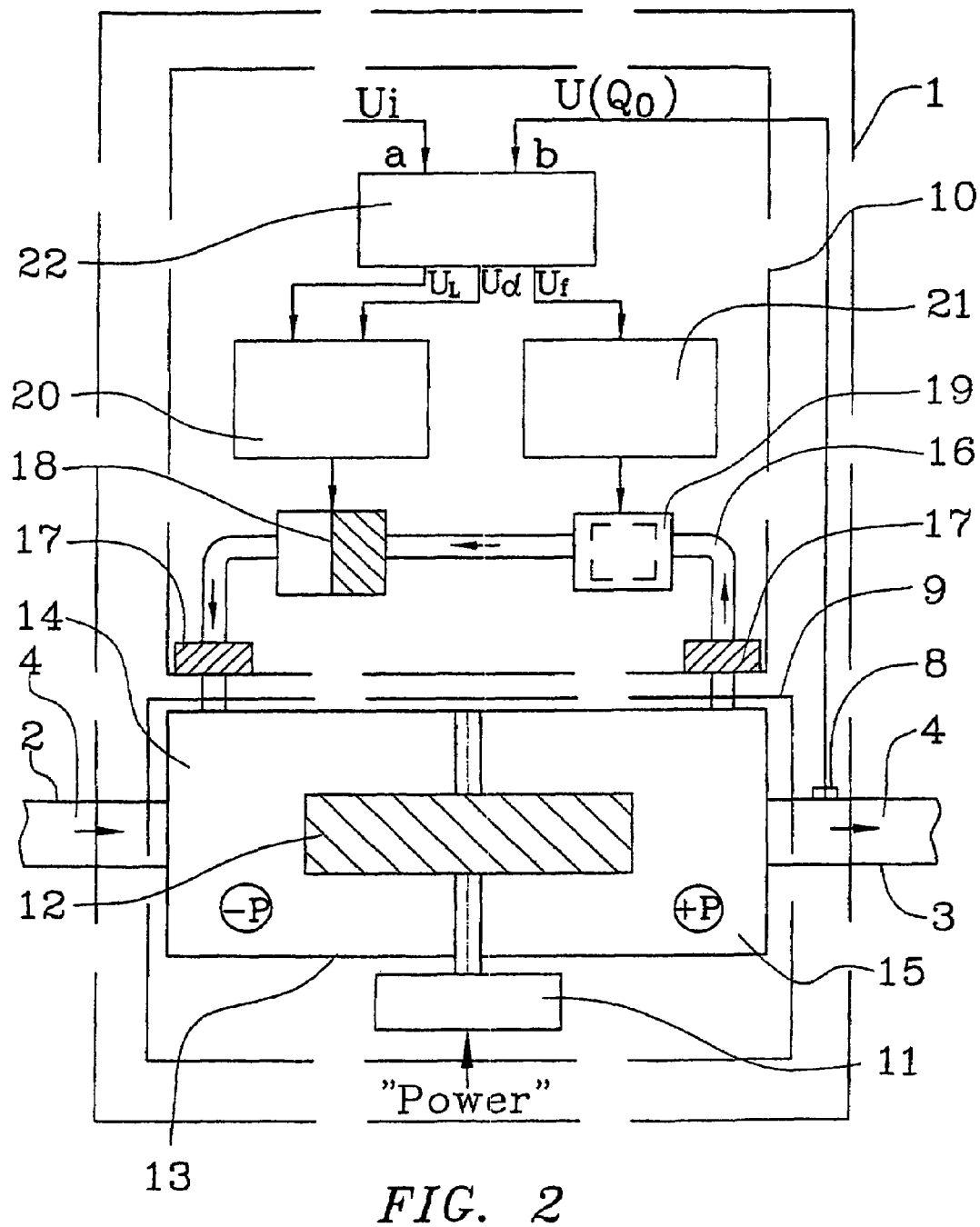
FIG. 2 is a view showing a block diagram of a possible functional structure of a controlled dynamic action means, with an example of a control dynamic hydropump, in accordance with the present invention.

The dynamic hydropump 1 includes in general a electromechanical pumping device (a pressure drop means) 9 and also a modulator 10 which realizes a "Principle of controlled inner dynamic shunting" of working zones of the pressure drop means (the pumping device 9). In accordance with a block diagram of a possible functional structure of the controlled dynamic hydropump 1 (FIG. 2), the electromechanical pumping device 9 has an electrical drive 11 which is structurally connected with a multi-blade wheel 12, a working casing 13 which is structurally separated into two working zones 14 and 15. The working zone 14 in which during operation of the pumping device 9 a negative over pressure (−P) is generated, is connected with the inner cavity 4 of the suction portion 2 of the hydrotransporting line. The working zone 15 in which during the operation of the pumping device 9 a positive over pressure (+P) is generated, is connected with the inner cavity 4 of the pumping portion 3 of the hydrotransporting line. The over pressures (−P) and (+P) are generated in the working zones correspondingly with respect to a normal pressure of an ambient medium ($P_{atm}$). The modulator 10 functionally has a throughgoing passage 16 which is connected with its end to inner cavities of the working zones 14 and 15 of the pumping device 9, a filter (or several filters) 17 for the carrying medium (water) 7, a correcting unit 18 used for setting (giving) initial area and shape of a minimal cross-section of the throughgoing passage 16, a valve unit 19 which is used for periodically changing the given area of the minimal cross-section (of a given shape) of the throughgoing passage 16 during modulation of the value of the action in the pressure drop action means (electromechanical pumping device 9), a drive 20 of the correcting unit 18 for displacing of its moving elements for setting (giving) of given initial area and shape of the minimal cross-section of the throughgoing passage 16, a drive 21 of the valve unit 19 for displacing of its movable valve element for providing a periodical change of the given area of the minimal cross-section (of a given shape) of the throughgoing passage 16 and a control block 22 having a setting input "a" and control input "b" connected with the sensor 8. A setting signal $U_i$ is supplied to the setting input "a" of the controls block 22. In the given example of the hydrotransportation of gravel, the sensor 8 controls a current volume rate ($Q_o$) of the transporting material (gravel) 6. A signal U ($Q_o$) is supplied to the control input "b" of the control block 22, the signal characterizing a current value $O_o$. The control block 22 has three controlling outputs. One output ($U_f$) is connected with the drive 21 of the valve unit 19. Two other outputs ($U_d$) and ($U_l$) connected with the drive 20 of the correcting unit 18.

The above described system of pipeline transportation (with an example of dynamic pumping hydrotransportation) which realizes the method of dynamic transporting of an object with a flow of carrying medium in accordance with the present invention operates in the following manner.

After supplying electrical energy to the electrical drive 11, structurally the multi-blade wheel 12 of the electromechanical pumping device 9 connected to it is driven in rotation. Conversion of mechanical energy of the rotatable wheel 12 into the action in or in other words a pressure drop (ΔP) is performed in the working casing 13 and applied to the carrying medium (water) 7. The pressure drop (ΔP) is formed by a simultaneous creation in the working zone 14 of the negative over pressure (−P) and in the working zone 15 of the positive over pressure (+P). The working zones 14 and 15 contact with the carrying medium so that the flow of the carrying medium created thereby acts on the object 6 (in the given case it is gravel) for providing the process of its transporting in a given direction (see FIG. 1). Under the action of the negative over pressure and correspondingly a suction force created thereby at the suction inlet 5 and in the interior cavity 4 of the suction portion 2 of the hydrotransporting line, gravel (object 6) is displaced under the action of the flow of the carrying medium 7 from the zone of its creation to the pumping device 9. This is predetermined by the value of the negative over pressure (−P) which is created in the working zone 14 of the pumping device 9. Then the flow of water with gravel passes the working passage of the pumping device 9 and continues its movement in the inner hollow 4 of the pumping portion 3 of the hydrotransporting line to its end. The latter takes place under the action of the pumping force which is determined by the value of the positive over pressure (+P) created in the working zone 15 of the pumping device 9 of the hydropump 1.

The above described process corresponds to the realization of a traditional methodological approach (traditional mode of operation), which takes place in known systems of pipeline hydrotransportation, using integral action which is constant in time the pressure drop (ΔP) applied to the carrying medium by the pressure drop means (in this example—an electromechanical pumping device 9). At the same time in the described example of the dynamic pumping hydrotransportation, controlled dynamic action means is utilized, in particular the controlled dynamic hydropump 1 which, in addition to the pumping device 9, also has the modulator 10 which realizes the "Principle of controlled interior dynamic shunting" of the working zones 14 and 15 of the pressure drop means (pumping device 9). During the operation of the modulator 10, a new dynamic (modulating) mode of operation of the controlled dynamic hydropump 1 will be realized.

In an initial position before the operation of the modulator 10 the throughgoing passage 16 is closed by the valve unit 19 which creates a local zone of structural border of separation between the working zones 14 and 15. When the modulator 10 is turned on, the movable valve element of the valve unit 19 moves under the action of the drive 21. The given periodic change of the given area of the minimal cross-section of the given shape of the throughgoing passage 16 takes place, in which was preliminarily set in the process of displacement of the movable elements of the correcting unit 18 under the action of its drive 20. The displacement of the movable value element of the valve unit 19 in turn leads to a given dynamic periodic "destruction" and subsequent restoration of the given created local zone of the portion of structural border of separation between the working zones 14 and 15 with a simultaneous given change of the valve of the area of local "destruction" in each period. A given dynamic periodic generation of a throughgoing passage is provided at the given portion of the border of separation between the working zones (through the throughgoing passage 16) with a simultaneous given change of the value of the given area of a minimal cross-section of the passage in each period of its creation.

Thereby a given dynamic periodic change of the value of connection between two working zones 14 and 15 is performed, with a simultaneous given change of the value of the connection in each of its periods. During this process under the action of the difference of the over pressures in the working zones (+P) and (−P), the throughgoing passage 16 in each period of the connection is filled with the carrying medium (water) 7 which passes through the filter (or several filters) 17. The filter performs filtration of a local volume of the carrying medium in the zone of connection of the throughgoing passage during the transporting of the object 6 by the flow of the carrying medium 7. The filter 17 provides a protection of the internal cavity of the throughgoing passage 16 from entering of the material transported by the flow or other foreign inclusions.

Figure 3:
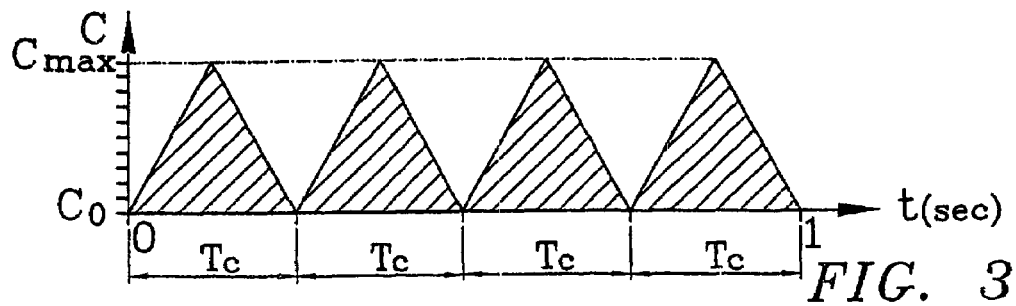
FIG. 3 is a view illustrating an example of a given dynamic periodic change of a value of connection of working zones provided by a modulator which realizes the "Principle of controlled internal dynamic shunting"
Figure 4:
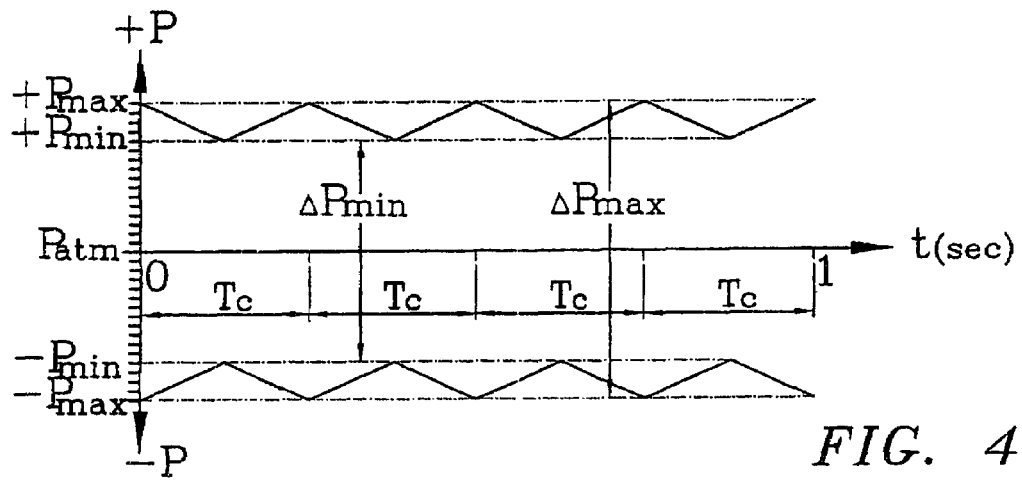
FIG. 4 is a view showing an example of simultaneous given dynamic periodical change of a value of a negative over pressure (−P) and a value of a positive over pressure (+P) in each period of a change in corresponding working zones of a controlled dynamic hydropump.

In turn, the given change of the value of the connection (C) in each period $T_c$ which is performed by the above described technical means with the passage 16 of the modulator 10 (FIG. 3) leads to a simultaneous given dynamic periodic change of the value of the negative over pressure (−P) and the value of the positive over pressure (+P) in each period of their change in corresponding working zones 14 and 15 of the pressure drop means (in this example it is the electromechanical pumping device 9). The value of the negative over pressure (−P) as shown in FIG. 4 is dynamically periodically changing in a given range $(-P_{max}) \div (-P_{min})$, while the value of the positive over pressure (+P) simultaneously periodically changes within a given range $(+P_{max}) \div (+P_{min})$. The above mentioned values of the over pressures $(-P_{max})$ and $(+P_{max})$ correspond to a moment when the displacing movable valve element of the valve unit 19 completely closes the given minimal cross-section of the given form of the throughgoing passage 16. This situation occurs in each period $(T_c)$ periodically (with the frequency $f=1/T_c$) of the repeating displacements of the movable valve element of the valve unit 19. In this moment the above mentioned local zone of the given portion of the structural border of separation between the working zones 14 and 15 in the throughgoing passage 16 is completely restored to provide a minimal (in this case it is zero) value of their connection $(C_0)$. The values of the over pressures $(-P_{min})$ and $(+P_{min})$ correspond to a moment when the above mentioned displacing movable valve unit 19 completely opens the given minimal cross-section of the given form of the throughgoing passage 16. In this moment the local zone of the portion of the structural border of separation between the working zones 14 and 15 in the throughgoing passage 16 is completely "destroyed" so as to provide (FIG. 3) a maximal value of their connection $(C_{max})$.

Therefore as a result of the above mentioned dynamic periodic shunting interaction of the elements of the modulator 10 with the working zones 14 and 15 of the pumping device 9 in the controlled dynamic hydropump 1, a given modulation of the value of action in the pressure drop means (ΔP) in the given range of (d) of its dynamic periodic change $(\Delta P_{max})$ $(\Delta P_{min})$ is performed during the process of transporting of the object (FIG. 4).

The given modulation is performed with given values of its parameters: frequency, range and law of dynamic periodic change of the value of the action (ΔP). In the given example the given range (d) of the given modulation is determined the value of the given area of a minimal cross-section of the throughgoing passage 16 which is established by a given displacement of the movable element of the correcting unit 18 by means of its drive 20, which is set by a command $(U_d)$ supplied to it from the control block 22. For technical realization it is possible to use for example various types of closing flaps or locks with a controlled drive (electrical, electromagnetic, pneumatic, hydraulic, etc.). The above mentioned law (l) of the given modulation is determined by the given shape of the given minimal cross-section of the throughgoing passage 16, which is set by the displacement of another shape-providing movable element of the correcting unit 18. The given displacement is set by another command $(U_l)$ which is supplied from the control block 22 to the same drive 20, which switches in accordance with this command for the displacement of the shape-providing movable element. It is possible to use here, for example, ring-shaped or disc-shaped controlled movable elements which have various shapes of edges of their cross-section, superposed on the minimal cross-section of the throughgoing passage 16. When it is structurally necessary, the form-shaping movable element of the correcting unit 18 can have its own controlled drive which is connected directly with the output $(U_l)$ of the control block 22. At the same time the given frequency (f) of the modulation is determined by a speed of displacement of the movable valve element of the valve unit 19 under the action of the drive 21, which is provided by command $(U_f)$ supplied from the control block 22. The valve unit can be provided for example with rotatable disc-shaped or cylindrical valve elements (with one or two throughgoing "windows"), the nearly linearly moving spherical or conical valve elements, etc. The movable valve element of the valve unit also is structurally connected with the controlled drive (electrical, electro-magnetic, pneumatic, hydraulic, etc.). At the same time, in addition to the above mentioned technical principles, the device of the modulator can have analogous functional elements which use other controlling principles (physical, chemical, physical-chemical, etc., and also their possible combination). This makes possible to use in the modulator a "destruction means" which is analogous in its principle of operation and provides the given dynamic periodic local destruction of the portion of the border of separation between the working zones of the pressure drop means.

The control block 22 in the given example is formed so that it provides performance of two control modes for providing the modulation of the value of action in the pressure drop means ($\Delta P$).

A first ("open") mode of operation of the control block 22 provides fixing of given values of parameters of the modulation: frequency, range and law of dynamic periodic change of the value of the action ($\Delta P$). In this mode a setting signal $U_I$ is supplied to the setting input "a" of the control block 22. The block 22 (with consideration of introduction of new setting elements into its operational algorithm) develops required fixed commands ($U_d$), ($U_L$) and ($U_f$) which are supplied to the corresponding inputs of the drives 20 and 21. The latter act on the corresponding movable elements of the correcting unit 18 and the valve unit 19 to provide fixed setting of values of the parameters of the modulation: frequency, range and law of dynamic periodic change of the value of action ($\Delta P$). If the setting signal $U_i$ remains unchanged during the transporting of the object 6, then the given values of parameters of the modulation do not change. In the case of fixed change of the setting signal ($U_i$) the given values of parameters of the given modulation are changed also in fixed fashion. Depending on the algorithm of operation of the block 22, values of one or several parameters can be fixedly changed.

A second ("closed") mode of operation of the control block 22 provides a current control of values of the parameters of modulation ("floating" mode). In this mode a signal $U(Q_o)$ which characterizes a current value of the volume rate ($Q_o$) of the transporting material (gravel) 6 is supplied to the control input "b" connected with the sensor 8. The block 22, with consideration of the comparison of the current value of signal $U(Q_o)$ with given values of parameters of the algorithm of its operation, generates a required current command ($U_d$), ($U_l$) and ($U_f$) which are supplied to the corresponding inputs of the drives 20 and 21. The latter continuously act on the corresponding movable elements of the correcting unit 18 and valve unit 19 to provide a current control of given of the value of the parameters of modulation of the value action ($\Delta P$). With the consideration of the algorithm of the operation of the control block 22, it is possible to provide a current change of a value only one or values of several of the giving parameters of the modulation in given dependence on current changes of controlled characteristic ($Q_o$) connected with the process of transporting of the object. Thereby, an algorithm "adaptation" of the combination of the parameters of the modulation to a current change of the controlled (in this example) characteristic ($Q_o$) is performed. The dynamic optimization of the current control of the process of transporting of the object in accordance with a selected controlled criterion ($Q_o$) is provided.

In various systems when it is necessary to solve various optimization problems of the current control, the algorithm of the control block 22 can provide one of seven main dynamic modes of the given modulation.

Possible variants of the algorithms, with which the current control for giving values of only one of the above mentioned parameters of the given modulation is provided a the of range dynamic periodic change of the value of action ($\Delta P$), during the current constancy of setting of two others parameters (frequency and law), provide realization of the dynamic mode of the given "amplitude" modulation. In this case the current values of the range (d) given by the algorithm can change within any limits and can be selected from zero to tens percentages of the $\Delta P_{max}$ (with consideration of the concrete task of the current control).

The realization of the other dynamic mode, a given "frequency" modulation, can be performed during the current control of giving of the values also of only one from the parameters of the modulation: frequency, with current constancy of giving of two other parameters (range and law). Here the current values of the frequency (f) given by the algorithm can also change within any limits and can be selected from zero to tens Hertz (with consideration of the concrete task of the current control).

During the realization of one more possible dynamic mode: given "modification" modulation, the current control of giving the values of also only one from the parameters of the given modulation: law, with current constancy of giving of two other parameters (range and frequency) is performed. In this case the current types of the law (l) which is given (modified) by the algorithm can also be changed within any possible limits for realization and can be selected with consideration of the concrete task of the current control. By means of the correcting unit 18 of the modulator 10, various laws of the modulation can be given, for example trapezoidal, sinusoidal, rectangular, triangular and other more complicated laws.

Variants of the algorithms are possible, with which the current control of giving the values of only two of the parameters of the given modulation can be performed: a range and a frequency of dynamic periodic change of the value of the action ($\Delta P$), with a current constancy of giving of only one of the parameters, law, can be performed, which provide realization of the dynamic mode of given "amplitude-frequency" modulation.

The realization of another dynamic mode given "amplitude-modification" modulation can be performed during the current control of giving of the values also of only two of the parameters of the given modulation: a range and a law, with current constancy of giving of only one of the parameters (frequency).

During realization of one more possible dynamic mode of given "frequency-modification" modulation, the current control of giving of the values also of only two of the parameters of the given modulation: a frequency and a law is performed, with the current constancy of giving of only one its parameter (range).

More complicated variants of the algorithms are possible, with which the current control of giving of the values of all parameters of the given modulation is performed: frequency, range and law of dynamic periodic change of the value of the action ($\Delta P$), for providing realization of the dynamic mode of a given "complex" modulation.

It is necessary to mention that in some cases in the systems which are similar to the above described system, the values of the changing parameters of the modulation can be given (optimized) during the process of current control with them in a given dependency from the current changes of a combination of several controlled characteristics, connected with the process of transporting of the object. In this case the control block 22 can have some control inputs, for example "$b_1$", "$b_2$" . . . "$b_n$". In addition, the control block 22 can have also several giving control inputs, for example "$a_1$", "$a_2$" . . . "$a_n$", which are used for fixed input giving of a value of one or values of simultaneously several parameters of the modulation, and also are used for giving variants of algorithm of operation of this block.

Figure 5:
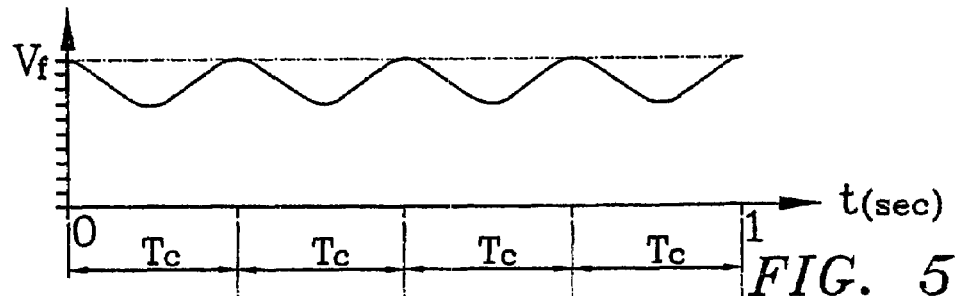
FIG. 5 is a view showing an example of a dynamic change of a value of a speed of movement of dynamically created flow of a carrying medium during a process of transporting of an object.
Figure 6:
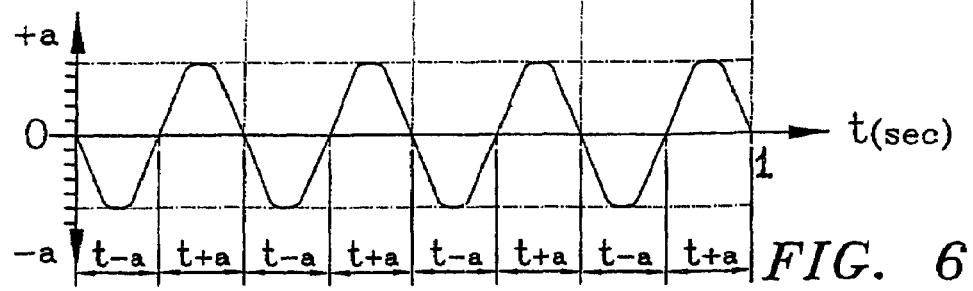
FIG. 6 is a view showing an example of a given dynamic periodic change of a value of sign-alternating acceleration of movement of a dynamically created flow of a carrying medium during the process of transporting of the object.

The above mentioned process of realization of given modulation of the action value (ΔP), with given frequency and law in a given range $(\Delta P_{max}) \div (\Delta P_{min})$, its dynamic periodic change in the pumping device 9, determine an adequate (dynamic) process of change of the speed of movement of the flow of carrying medium (water) 7 during the process of transporting of the object (gravel) 6. In this case the dynamic reduction of the value of speed ($V_f$) of the movement of the flow of carrying medium corresponds to the dynamic reduction of the value of the action (ΔP) as shown in FIG. 5, which in turn characterizes the time interval ($t_{-a}$) of the movement of the flow with a negative acceleration: $-a = -dV_f/dt$ (FIG. 6). At the same time the dynamic increase of the value of speed ($V_f$) of the movement of the flow of the carrying medium corresponds to the dynamic increase of the value of the action (ΔP) which in turn characterizes the time interval ($t_{+a}$) of the movement of the flow with positive acceleration: $+a = +dV_f/dt$. Therefore the forcedly modulated dynamic speed process characterizes the mode of movement, with which the whole dynamically created flow of the carrying medium moves with a given dynamic periodically changing alternating-current acceleration (±a), which is forcedly rigidly given during the process of transporting of the object (FIG. 6). Dynamic parameters of the above mentioned mode of movement with alternating-current acceleration (±a) reflect the dynamics of the energy action applied to the flow. It is necessary to mention that high frequency of a periodic dynamic change of the value and sign of the acceleration determines a principally new mode of dynamic creation of the flow. This mode of movement of the whole flow of the carrying medium is a main (determinative) characteristic of the proposed method, and its realization in this example is provided due to a relatively high-frequency use of the "Principle of controlled internal dynamic shunting" of working zones of the pressure drop means.

It has been determined by the research of the author that with the realization of the new method in systems of pipeline transporting of various materials and media, high energy efficiency is achieved first of all due to minimization of a negative dominating influence of turbulence on losses of kinetic component of the applied energy in the zone of a boundary layer and in a nucleus of the flow of carrying medium in the process of transporting of object. The latter effect is achieved due to longitudinal "vectorization" of the turbulent flow, which reflects the influence of dynamic force energy action on coherent whirling structures of the flow (up to their "suppression"-"throw off") and as a result—"pseudo-laminarization" of flow. At the same time practical non-compressibility of the carrying medium is taken into consideration, which determines the speed of propagation of the wave of the applied energy action along the flow, practically equal to the speed of sound. Application to the dynamically created flow of the dynamic forcibly-modulated in value over pressure (energy action), which predetermines its movement with the given dynamic periodic sign-alternating acceleration, provides this dynamic energy action on the transporting object during a whole period of process of its transportation by the flow of carrying medium. During this process, interphase friction is reduced and positive role "phasing" (or temporary shifts) is increased with occurrence of hydrodynamic processes in a turbulent flow located in a non-linear region of their influence (with consideration of times of "generation" and "destruction" of coherent structures, and also of inertia properties of movement of the object and a nucleus of the dynamic flow). During selection of the modes of modulation, differences are taken into consideration between dependencies of processes of "formation" and "destruction" of its coherent whirling structures, correspondingly from positive or negative sign and also from dynamic change of the value of sign-alternating acceleration (±a), which reflect resulting dynamic characteristics of corresponding "fronts" of relatively high-frequency energy action on the dynamically created flow of carrying medium.

In addition, the above described possibility of the inventive-method to provide the given dynamic multi-parameter modulating control of the process of dynamic transporting of an object with a flow of carrying medium is in principle a new characteristic for solving of such tasks. This possibility of the inventive method allows to give and control in dynamics, one or simultaneously several parameters of modulation of the energy action applied to the flow (in the given example—ΔP). The time (frequency) parameter of modulation of the applied energy action can be provided to be similar (up to "resonance" occurrences) with time (frequency) characteristics of turbulent pulsations in the flow. These parameters of modulation of the value of action (ΔP) can be set so as to provide "determination" of more high frequency local turbulent waves (whirling formations) so as to determine reduction of their "lifetime" and as a result, the optimization (minimization) of energy losses connected with occurrence of negative factors in the turbulent flow.

Possibilities of technical realization of the proposed method to provide optimizing "search" of these "resonance" modes of control with the above mentioned parameters of the process of modulation energy of action on the flow open the perspectives of establishing in the flow of a principally new state-energy mode "standing wave". These factors are qualitatively new and decisive in the process of providing a significant minimization of various components of energy losses during transporting of the object with the use of the proposed method. It is necessary to note that the process of minimization of energy losses reflects the possibilities of the method, as a method for controlling of energy parameters of a turbulent flow (method of "controlling" turbulence). Taking into consideration the main role of the turbulent processes in energy losses in a flow, it is possible to make a conclusion about significant possibilities of the proposed method to provide dynamic energy optimization of the process of transporting of object with a flow of carrying medium (including a principally new condition of the energy mode of the flow—"Superconductive flow", as it is named by Dr. A. Relin).

In addition, the above mentioned possibilities for controlling with the proposed method allow to change dynamically integral speed (rate) parameters of the flow of carrying medium, and therefore of the object transported thereby.

It is necessary to mention that the above mentioned minimization of various hydrodynamic components of energy losses is provided on the background of a significant (reaching tens percentages) reduction of integral value of the energy action applied to the flow. The latter is connected with the above mentioned process of modulation of a difference of over pressures in the working zones 15 and 14: (+P) and (−P) of the pumping device 9 with the use of the "Principle of controlled interior dynamic shunting" of working zone of the pressure drop means. At the same time the process of modulation determines the reduction of consumption (a conditional "recuperation") of the supplied electrical energy which is converted (through its conversion into a mechanical energy) into the above mentioned operational over pressures. In this process the "Principle of controlled internal dynamic shunting" of working zones is characterized by exceptionally low losses of energy. This can be explained by realization of the process of dynamic periodic connection of the working zones through a minimal cross-section of a given form of the throughgoing passage 16 of relatively low length, which is characterized by an insignificantly low hydrodynamic resistance. This in turn determines a significant reduction of consumption of the supplied energy which is converted (consumed) by the action means (in this example—electrical energy consumed by the electromechanical pumping device 9 of the controlled dynamic hydropump 1). These conditions, and also maintenance by the flow of carrying medium of high integral speed parameters (due to the significant reduction of energy losses in the flow and its inertia properties) determines the possibility of providing a significant specific energy efficiency of the proposed method.

In addition, the use of the proposed method in such systems of pipeline transportation of various materials and media determines a significant reduction of adhesion of their particles on the surface of the inner wall of the pipeline. This is connected with dynamic changes of the value of sign-alternating acceleration ($\pm a$), which reflect resulting dynamic energy characteristics of corresponding "fronts" of the energy action on the flow of carrying medium and as a result on the particles. The effect of longitudinal "swinging" of the particles which is generated in this case, significantly reduces a probability of their possible "adhesion" with one another, and also with the surface of the inner wall of the pipeline. The same dynamic characteristics of the method determine also other possibilities: significant reduction of a possibility of "clogging" of the pipeline with the transporting material; significant increase (by tens percentages) of energy efficiency of suction of the material with a surface to be cleaned (due to the "agitation" effect generated during this process); and also a significant reduction (several times) of a force necessary for displacement of the suction element (for example the suction inlet 5) near the surface to be cleaned which practically excludes the possibility of its "sticking". At the same time the dynamic nature of the action on the flow leads to a significant improvement of its structurization, and also to the increase of efficiency of its possible technological filtration. All listed possibilities of the method in turn also determine a significant contribution to a general reduction of technological components of energy losses. As a result, with the use of optimal modes of controlling of the process of dynamic transporting of the object with a flow of carrying medium, the reduction of specific consumption of energy consumed by the process can reach tens percentages.

The above mentioned additional possibilities of the proposed method are connected with a dynamic consideration of characteristics (criteria) of the process of transporting of object with the flow of carrying medium for optimization of the multi-parameter dynamic control, by providing of the above mentioned process (for the purpose of increase of its energy efficiency). In the presented example of realization of the inventive method, as a controlling characteristic connected with the provision of the process of transporting of the object 6 by the carrying medium 7, a current value of a volume rate ($Q_o$) of the transporting material (gravel) controlled by the sensor 8 with a signal $U(Q_o)$ is utilized. However, for solution of various specific tasks of controlling of similar hydrotransporting or pneumotransporting processes of various materials and media, also other controlled characteristics can be utilized, for example:

values of various parameters of the process of transporting of the object with a flow of carrying medium (energy, rate, optimized specific rate of energy or speed);

value of various parameters of the object to be transported (speed, structure, physical, chemical, geometrical or amplitude-frequency);

and also in some cases a physical-chemical characteristic of the surface on which the object is located;

values of various parameters of the flow of carrying medium (speed, structure, physical or chemical; pressure in internal cavity of a suction or pressure parts of a pipeline; amplitude parameter or frequency parameter characterizing a turbulent process of movement of the flow of carrying medium during the process of dynamic transporting of the object; and also an energy parameter characterizing influence of turbulence during the movement of flow of carrying medium on energy characteristics on the process of transporting of the object); etc.

Various types of known and special means for controlling of the above listed (or other) characteristics to be controlled can be utilized. For example, for the current dynamic control of speed of movement, volume concentration and volume rate of the material transported by the flow, special means for control developed by the author can be utilized, such as those disclosed in U.S. Pat. No. 5,502,658 (1996) "SCP Method of Velocity Measurement of the Object." (A. Relin), or in the book "The Systems of Automatic Monitoring of Technological Parameters of Suction Dredger" Moscow, 1985 (A. Relin). The "SCP method" of measurement can be also used for dynamic control of speed of movement of the flow of carrying medium or parameters of its sign-alternating acceleration.

Such means for control can be successively used in the inventive method, for example in the systems of hydrotransportation of pneumo transportation of double-phase or multi-phase flows which are characterized by the presence, correspondingly, of liquid or gaseous carrying medium and also transporting material, medium or mixture (object). As the object, it is possible to use for example: gravel, coal, ore, cement, natural resources to be excavated or powder materials, components or refuses of industrial manufacture, physiological substance, etc.

In some systems of pipeline transportation, the transporting object (for example oil, natural gas, water, liquid chemical medium, liquid or gaseous fuel) is practically a single-phase flowable medium and performs the functions of the carrying medium. Analogous use in such systems of the inventive method (with consideration of its optimization possibilities) also allows to significantly increase their energy efficiency.

The use of these principles of formation of dynamic means of action on a flow of carrying medium (of the type of the above mentioned controlled dynamic hydropump 1) allows to create a principally new class of controlled dynamic optimization pressure drop means (pumps, etc.) which is defined as "Dynamic optimization systems". Such a system is characterized by structurally united and functionally connected main functional components: an action means for acting on a flow of carrying medium; built-in modulation means for modulation of the action; control means for controlling the operation of the modulation means; means (one or several means) of current control of a characteristic connected with providing the process of transporting of the object by the carrying medium. Such "Dynamic optimization system" can be produced as an independent dynamic controlled means of automation for use in various systems of a pipeline transportation.

At the same time, for providing of the inventive method in acting systems of a pipeline transportation, the pressure drop means which preliminarily is installed in them (pump, etc) must be additionally equipped with the device "Modulator" (like modulator 10). Such a device "Modulator" can be also produced as an independent means for automation, for example in various systems of pipeline transportation. Such a device "Modulator" can have various structural solutions for units of their external connection to the working zones of the conditional pressure drop means. These units can be disconnectable and also non disconnectable and must provide a reliable structural connection of the ends of the throughgoing passage of the device "Modulator" (as the throughgoing passage 16 of the modulator 10) to internal cavities of the working zones from their accessible external side connected with the pipeline. These units can be additionally provided with a means for fixed closing of a connection of the working zones with the throughgoing passage (valve, flap, etc.). Such a technical solution will allow to remove the device "Modulator", for example for performing repair works without disturbing a mode of exploitation of the pipeline transportation. In addition, such units can be additionally provided with special "reflectors" which provide additional protection of an inlet of the throughgoing passage from entering of large solid inclusions from the flow during the period realization of the process of connection of the working zones.

In some cases, for finding the solution of special technological tasks in manufacturing processes (for example with long pipelines provided by traditional means of pressure drop and not allowing a connection of a transporting fluid with an ambient medium), the inventive method can be also used efficiently also analogous for dynamic energy "control" of a long portion of the pipeline transportation. In this case, on conditional "working ends" of the portion in the flow, conditional working zones are separated which determine a working pressure drop. In this case the throughgoing passage of the device "Modulator" is structurally connected with its ends to the internal cavities of the working zones. Such functional configuration of the system to be created provides a possibility of realization of the "Principle of controlled internal dynamic shunting" of internal cavities of the working zones of the conditional pressure drop means (the portion). In this case, the possibility is provided for creating the above mentioned controlled dynamic energy action on the flow. Such a solution, in some cases, can be also efficiently used for long ascending portions of suction pipes which are used widely for example in a metallurgical, chemical, energy-related and other facilities. This use of the inventive method significantly improves aspiration and possible filtration of technologically withdrawable flow.

The inventive method can be also used for optimization of turbulent structure and geometry of a burning zone (for example in a turbo-reactive system or during flowing of fuel into a furnace) for the purpose of increasing of energy efficiency. All above mentioned "pipeline" examples of possible use of the proposed method are characterized by the presence of long portions of a pipeline, along which a transporting "closed" flow of carrying medium is movable. However, in practice there are "open" systems in which the action means (for example a pressure drop means) act on the flow of carrying medium which is not limited by a long pipeline. In this case the flow which is created acts on the object which is located on a fixed (or changeable) distance from the action means. Depending on the direction of application of the flow on the object, pumping or suction action on it can be created for its possible displacement in a given direction or for its destruction (with a subsequent transportation). The use in these systems of the inventive method also significantly increases their energy efficiency due to the creation of optimal characteristics of a dynamic energy action of flow of the carrying medium on the object. For this purpose it is possible also to use efficiently one of the above mentioned technical solutions which realize the method: "Dynamic optimization system" or the device "Modulator" connected to the working zones of the exploitational pressure drop means. In such "open" systems for creating the optimal characteristics of dynamic action, a special importance resides in the possibility of consideration and current control of several special characteristics. They can include (but not limited) value of parameters of the transporting object (aerodynamic, hydrodynamic, structural or geometric; and also a size parameter which characterizes a mutual location of the means of action and the object; a rate parameter of the object; a parameter which characterizes amplitude-frequency characteristic of the object, or a parameter characterizing a physico-mechanical characteristic of a surface on which the object is located). The current control of some of the specific characteristics during the realization of the inventive method allows to optimize the process of creation of dynamic energy action on the object, for example with consideration of "resonance" characteristics of the process of its destruction or tearing off from a surface, and in some technological tasks also for providing a given selection (sorting) of objects which have various parameters.

The inventive method can be also used for optimization of turbulent structure and geometry of a burning zone (for example in a turbo-reactive system or during blowing of fuel into a furnace) for the purpose of increasing energy efficiency.

All above described examples of possible realization of the inventive method in "structurally non-connected" systems of transporting of object with a flow of carrying medium are characterized by the absence of structural (rigid) connection between the transporting object and the action means. In this case the object is moved relative to the action means by a flow of the carrying medium. At the same time the proposed inventive method can be also efficiency used in known "structurally connected" systems of transporting of an object with the flow of carrying medium. Such systems are characterized by a structural (rigid) connection between the transporting object and the action means. In this case the object is displaced together with the action means under the action of a flow of carrying medium created by the action means, which flow interacts with the object.

Examples of such objects of "structurally-connected" systems can be: air apparatus (for example an airplane or a rocket); speedy abovewater and underwater apparatuses, or for example speedy overground apparatuses, used as the action means for example pump, screw, turbine, turbo-reactive or reactive means for energy action on the carrying their medium. For realization of the inventive method in such "structurally connected" systems, the action means can be provided either by a built-in modulator such as the above mentioned "Dynamic optimization system", or by additional modulator such as the above mentioned "Modulator", connected to the working zones of the used action means (for example pressure drop means). The throughgoing passage 16 of the modulator (like the modulator 10) is structurally connected with its ends correspondingly to the inner cavities of the two working zones separated in the action means of such a system: to a working zone of conditional "negative over" pressure and to the working zone of conditional "positive over" pressure. Such functional configuration of the system provides the above mentioned possibility of realization of the "Principle of controlled internal dynamic shunting" of inner cavities of the above mentioned working zones of the pressure drop means, so as to create the controlled dynamic energy action on the flow.

The realization of the inventive method in such "structurally connected" systems leads to the situation that the whole dynamically created flow of carrying medium will move with a given dynamic periodically changing sign-alternating acceleration during the process of transporting of the object. In this case the object is also moving dynamically with the sign-alternating acceleration. The dynamic forced aerodynamic or hydrodynamic interaction of the moving object with a gaseous or liquid medium flowing around its surface (for example a portion of an exterior surface of a casing of flying or submarine apparatus) will provide minimization of various components, correspondingly aerodynamic and hydrodynamic energy losses. In this process, one of the main factors is the factor of minimization of negative dominating influence of turbulence on the losses of kinetic component of the applied energy in the zone of a border layer and in the nucleus of the flow of carrying medium during transporting of such an object.

Another important factor of minimization of energy losses is a significant reduction of aerodynamic (hydrodynamic) "front" resistance during the above mentioned dynamic mode of movement of the apparatus. Taking into consideration the significant reduction of consumption of the supplied energy in the inventive method, which is converted (consumed) by the action means, inertia of the moving object, as well as the positive factors providing minimization of various components of losses of the energy, it is possible to expect a high energy efficiency of the use of the inventive method in such "structurally-connected" systems.

Optimization of multi-parameter dynamic control by the inventive process of dynamic transportation of such apparatuses is connected also with efficient use of various specific controlled characteristics, such as for example: value of speed, aerodynamic, hydrodynamic and geometric parameters of the object; value of a size parameter which characterizes a position in space of the object during the process of its transporting; values of various parameters of the flow of carrying medium, etc. The above mentioned, with consideration of the dynamic control of the systems which realize the inventive method, determines a significant (reaching tens percentages) reduction of a specific consumption of energy for transportation of such apparatuses, which allows to obtain an additional energy resource for possible increase of maximal speed or distance of their movement.

At the same time, it is known that the supplied energy of forced aerodynamic or hydrodynamic interaction of the exterior surface of the moving speed apparatus (with any engine) with a gaseous or liquid exterior medium flowing around it in turn is converted into action energy in this "convertor". Such "surface-energy" systems are characterized in that the structural part of the object (apparatus) during the process of forced interaction with the carrying medium performs the function of a "converting" element of a conditional means of energy action. With this, the main type of energy action (in the shown example) is the energy of pressure drop. This pressure drop is created on the "converting" element in the process of conversion of the energy supplied to the "converter" due to provision of a working zone of the conditional "negative over" pressure and the working zone of conditional "positive over" pressure on various portions of a different-profile external surface of the moving speed apparatus (object). In the present case the working zones perform the functions of working zones of a conditional action means (pressure drop means), which acts on the exterior flowing medium. The local flow of the medium created in this process interacts in turn with the external surface of the structural part of the speed apparatus (object) so as to form known additional energy losses during its movement.

One of the many examples of such "surface-energy" systems can be an exterior surface of a wing or other different-profile parts of a body of an airplane, and also different-profile exterior surfaces of various known air, submarine, overwater and overground speed apparatuses.

With consideration of a relative inertia of the moving object, the use of the inventive method for dynamic control of a process of interaction ("transportation") of the local created flow of "carrying" medium with the structural part of the speed apparatus (object), opens qualitatively new possibilities of minimization of the energy losses.

For realization of the proposed inventive method in such "surface-energy" systems, the conditional action means can be provided with a modulator, such as the above mentioned "Modulator". The throughgoing passage of the modulator is connected with its ends structurally to a working zone of the conditional "negative over" pressure and the working zone of conditional "positive over" pressure, separated on various portions of a different-profile exterior surface of the moving speed apparatus. Such a functional configuration of the "surface-energy" dynamic system will provide the possibility of realization of the "Principle of controlled internal dynamic shunting" of internal cavities of the working zones of the conditional pressure drop means. In this case the creation of the above mentioned controlled dynamic energy action on the local flow of a "carrying" medium is provided.

The realization of the inventive method in such "surface energy" system leads to the situation that the whole local flow of a "carrying" medium will move with the given dynamic periodic sign-alternating acceleration during the process of interaction ("transporting") of the created local flow of the "carrying" medium with the structural part of the speed apparatus (object). In this case also the action on the structural part of the object will have an analogous dynamic nature. This determines the aerodynamic (hydrodynamic) effects which minimize various known components of energy losses connected mainly with a negative domineering influence of turbulence of the created local flow of a "carrying medium" on the losses of kinetic component of energy (applied to the structural part of the object) in the zone of a border layer above its exterior surface. One more important factor for minimization of losses of energy in such "surface energy" dynamic systems is a significant reduction of aerodynamic (hydrodynamic) "surface" resistance during the above mentioned dynamic mode of interaction of the created local flow of a "carrying" medium with the structural part of the speed apparatus (object).

Optimization of a multi-parameter dynamic control of the process of interaction of the local flow of a "carrying" medium with the structural part of the speed apparatus (object) is also connected with efficient use of specific controlled characteristics for example: value of various parameters of the created flow of a "carrying" medium (speed, structure, physical and chemical); values of amplitude parameter or frequency parameter which characterize a turbulent process of movement of the local flow; and also values of an energy parameter which characterizes the influence of turbulence on the movement of the created flow on the energy characteristics of the process of transporting of the object; or values of various parameters of the exterior surface of the structural part of the transported object (speed, aerodynamic, hydrodynamic, physical, chemical or geometric). It is possible to expect here a high energy efficiency of the use of the inventive method in the system of this type taking into consideration several factors: significant reduction of consumed energy supply to such "surface-energy" converting system, which is converted (consumed) in it by the conditional action means; inertia of the moving object; minimization of various components of losses of a kinetic component of its energy, etc. As a result, the energy efficiency can be expressed in a significant economy of energy, which is consumed by the speed apparatus, and also in obtaining of an additional energy resource for a possible increase of maximum speed or distance of its movement.

It should be noted that the above mentioned local principle of possible creation of functional creation of such "surface-energy" dynamic systems (with the use of the possibilities of the inventive method) allows to structurally overcome a great number of structural portions of such speed apparatuses (objects). In each such system (subsystem) it is possible to use for example one or several single-channel modulators (such as Modulator 10); single-channel modulators with several valve units operating in accordance with different laws; or a multi-channel modulator. The distinguishing structural principles for creating of such a multi-channel modulator is so that it provides a periodic connection of the above mentioned separated "paired" working zones with simultaneous given change of the value of the connection of them with one another in each period. The latter is achieved by creating of a dynamic periodic formation on the border of separation between several "paired" working zones, simultaneously of several throughgoing passages. These throughgoing passages have a uniting common portion with a given area of its minimal throughgoing cross-section. The given change of the value of the given area of the minimal cross-section of the common portion in such a multi-channel modulator is performed in each period of the process of creation of the throughgoing passages (and simultaneously with it) in the process of dynamic transporting of the object. With this, the above mentioned separated "paired" (having a pressure with a different sign) working zones have portions with a structural and also with a spacial border of separation between them. The above mentioned connection of the "paired" working zones which is performed by any of the above mentioned modulators, determines the dynamic periodic "destruction" of the integrity (with a subsequent "restoration") of one or several local zones on the portions (or portions) of a structural border of separation between them.

These possible variants of the structural realization of the proposed inventive method in such "surface-energy" dynamic systems determine a principally new structural realization of the so-called "breathing" surfaces (structurally connected with the channels of the modulators) on the structural parts of the speed apparatuses (objects). This allows to create principally new types of various speed apparatuses with practically non-inertia aerodynamic (hydrodynamic) surface-distributed controlled "dynamic rudders". In turn, these possibilities of the use of a method open qualitatively new ways to provide a dynamic energy efficient control of aerodynamic (hydrodynamic) characteristics of such apparatuses (objects) in the process of their movement.

It is necessary to mention that the above considered technical principles for creation of the dynamic systems can be used as a single-channel (one or several) and also multi-channel principles for formation of the modulator. The use of several controlled channels of modulation allow to build the control block with the possibility of realization of both "synchronous" and "asynchronous" control of their operation. Such an approach opens additional possibilities for creating of more complicated laws of the modulation in the case of solution of special tasks for providing dynamically complicated types of energy actions. At the same time it is necessary to mention that the above described technical solutions for creation of the dynamic systems (in the process of performing of the modulation) do not allow a contact of the inner cavity of the transporting closed channel with a surrounding ambience, for example atmosphere. In this case practically it is not necessary to solve structurally the tasks connected with a reduction of the level of an additional noise effect, which occurs in modulators realizing the "Principle of controlled exterior dynamic shunting" of a suction portion of the pipeline.

Another wide area of possible use of the proposed method includes various known processes of transporting (destruction) of an object by a flow of carrying medium, which use the action means of "explosive" principle of energy conversion. Such devices are for example known explosion devices of pumping and vacuum "spacious" action on the object. In addition, they also include various object transporting systems which used explosion energy for forming a "structurally-limited" action on the carrying medium, with a flow which displaces the object (for example piston systems of internal combustion engines, barrel weapon systems, etc.). In these systems "explosive" action means are utilized (chemical, physical-chemical, physico, etc.) which are characterized by an explosive principle of conversion of energy and using the "supplied" energy generated for example as a result of a chemical reaction, nuclear reaction thermal laser action, electrical discharge action, etc.

In the process of conversion in such "explosive" action means of the "supplied" energy, spacially (or partially structurally) limited working zones of a negative over pressure ($-P$) and a positive over pressure ($+P$) are created, which contact with the carrying medium so that the flow of carrying medium which is created in this situation acts on the object for providing the process of its transporting in a given direction (or for destruction).

In such explosion devices of pumping or vacuum "spacial" action which destroys the object, the working zones can have a conditional (spacial) border of separation between them. It is possible to realize in this case the inventive method with creation of the given dynamic periodical connection of the working zones with one another with a simultaneous given change of the value of the connection in each period during a dynamic action on the object of the "explosive" action means. The latter is provided by given dynamic periodic creation on the portion (or portions) of the spacial border of separation between the working zones of one (or several) throughgoing passages with simultaneous given change of value of the area of minimal throughgoing cross-section of each of the passages in each period of their creation during the "explosive" action on the object. This is achieved as a result of a given dynamic periodic local "destruction" with the subsequent "restoration" of the given portion of the spacial border of separation between the working zones with a simultaneous given change of the value of area of the local "destruction" in each period of its implementation.

The process of the given dynamic periodic local "destruction" of the spacial portion of the border of separation between the working zones can be performed by an additional "destructive" means (for example physical, chemical or physico-chemical) or by a combination of several types of "destructive" means. In this process the "destructive means" ("spacial modulator") periodically "triggers" in accordance with a given law in the process of explosion, and provides a realization of the "Principle of controlled internal dynamic shunting" of the internal cavities of the working zones of the "explosive" action means (as pressure drop means). This periodical "triggering" of the "spacial modulator" can be set, for example: by a number of parts "destructive" component; their different volumes; different chemical and physical critical parameters which determine a moment of beginning and end of their "destructive" action on the spacial portion (or portions) of the border of separation between the working zones; and also by a critical parameters which determine a time shift (periodicity) between the "destructive" actions, etc. In the process of implementation of the modulation of the value of "explosive" action the above mentioned dynamic energy action on the flow of the carrying medium which is created is performed, and the carrying medium in turn acts dynamically on the object.

In the explosive devices of pumping "spacial" action which destroys the object, the working zone of the negative over pressure (−P) is created in a center of the explosion, while the working zone of the positive over pressure (+P) is created in an external zone from the center of explosion. Therefore during the interaction of the working zones with the carrying medium its flow is created, which acts on the object for providing the process of its transporting (or its destruction) in a given direction from the center of explosion. In such explosive devices of vacuum (spacial) action which destroys the object, in the center of explosion the working zone of the positive over pressure (+P) is created, and in the external zone from the center of explosion the working zone of negative over pressure (−P) is created. Thereby, in this case during the interaction of the working zones with the carrying medium its flow is created which acts on the object for providing the process of its transporting (or its destruction) in a given direction toward the center of explosion. The possible realization of the inventive method in this case provides a given modulation of the value of the action in the "explosive" action means (pressure drop means). The modulation is performed by a simultaneous given dynamic periodic change of the value of the negative over pressure and the value of the positive over pressure with a simultaneous given change of the values of the pressures in each period of their change in corresponding working zones. This is performed so that the whole flow of carrying medium which is dynamically created, moves with a given dynamic periodic sign-alternating acceleration during the process of dynamic "spacial" action on the object. At the same time, the possible losses of energy of action connected with known turbulent effects during interaction of the flow with the object are minimized.

The given parameters of the modulation can be provided by fixedly given characteristics of the "spacial modulator". This is done with consideration of the amplitude-frequency characteristics of possible (selective) object of destruction (transportation). The frequency of modulation must be selected from the given time interval of occurrence of an explosive process. This approach opens qualitatively new ways for creation and significant increase of destructive (transporting) energy possibilities of such dynamic explosive devices. The above mentioned "spacial modulator" ("destruction means") in such a dynamic explosive device can be structurally formed for example as: physical, chemical or physico-chemical component (or components), constantly technologically introduced into the structure of the explosive device. In addition, the above mentioned "spacial modulator" can be formed as a separate exchangeable block which can be structurally installed (or replaced) in the construction of the explosive device. The block solution of the "spacial modulator" can have different fixedly given characteristics, which determine the parameters of modulation; or it can provide a possibility of selective setting (selection) of one of several variants of the characteristics. Such block solutions allow to significantly expand selective explosion (transporting) energy possibilities of such dynamic explosive devices, and therefore also to increase the efficiency of their use for solution of various tasks, for example in construction, in mineral and excavation industry and also in defense technologies.

The known explosive system which transporting of the object and use the energy of explosion for creating the "structurally-limited" action on the carrying medium for transporting of an object (for example piston systems of internal combustion engines, barrel gun systems, etc.) are characterized by the presence of structurally identified (for example on an inner wall of their guiding structure) portions of a border of separation between working zones created in them (−P) and (+P). Therefore, for realization of the proposed inventive method it is possible to use in them: the above mentioned types of the "spacial modulator" introduced into the zone of explosion (during a period of its implementation) by various technological and structural ways; and also the above mentioned types of structural modulator (the device "Modulator"), which provide the periodic dynamic connection of the separated working zones through its throughgoing passage (or passages). The last mentioned technical solutions allows to create dynamically similar systems of "structurally-limited" action with the possibility of flexible control (or optimization) of an energy process of dynamic action on a displacing object (for example, a piston or a missile) realized in them. This opens principally new possibilities for improvement of energy characteristics of the technical systems, which is achieved due to reduction of losses, for example for friction of object against an inner wall of the guiding structure; from turbulence of the flow of carrying medium, etc. In addition, in such dynamic systems a minimization of adhesion of products of combustion on the internal working walls will be achieved, as well as improvement of the operational of a filtering device which dynamically interacts with the created flow of carrying medium discharged from the system.

This "Principle of controlled interior dynamic shunting" of inner cavities of the working zones of the pressure drop means can be efficiently used for realization of the inventive method in other types of new dynamic systems, to provide the creation of the above mentioned controlled dynamic energy action on the flow (and on the object). They can include for example: dynamic single-contour (or double-contour) vacuum cleaning systems; dynamic medical suction devices for removal of non-conditioned physiological media; for taking gaseous and liquid physical probes; for providing gynecological processes, for therapeutic massaging procedures, for artificially created dynamic physiological systems based on physiological organs of life organism (heart, lungs, etc) with the use of converted energy which is discharged in them; for dynamic technological systems (for example for vacuum forming of mixtures, for selection of objects during their sorting, for underwater cleaning of surfaces of various objects, etc.). The realization of the inventive method in these and other similar systems significantly improves their energy and exploitation efficiency.

At the same time the proposed method can be efficiently realized not only in these systems which use as the action means acting on the carrying medium, the above mentioned types of pressure drop means. The inventive method can be efficiently realized in "energy" systems which use as the means of action on the carrying medium, a means of direct energy action (magneto-hydrodynamic pumps, magnetic and electromagnetic acceleration systems, etc.). In such action means the energy supplied to them (or several types of energy) is converted directly into a direct energy action on the carrying medium for creating its flow. As the supplied energy it is possible to use for example: electrical, electromagnetic, magnetic, etc. energy, or a combination of several types of energy (for example a combination of magnetic and electrical energy as in a magneto-hydrodynamic pump).

However, in such "energy" systems the modulation, as believed to be clear, can not be performed by realization of the "Principle of controlled internal dynamic shunting" which is used in the pressure drop means. In these "energy" systems the modulation of the value of the action in the means of direct energy action can be performed by providing of the given dynamic periodic change of the value of a parameter, which is dynamically connected with the process of conversion in the action means of the energy supplied to it into the action, with simultaneous given change of the value of the parameter in each period of its change, so that the flow of carrying medium which is dynamically created here moves with a given dynamic periodically changing sign-alternating acceleration in the process of transporting of the object.

For example in a magneto-hydrodynamic pump, as the changing parameter it is possible to use an induction of a magnetic field or an electrical voltage, applied to a portion of the carrying medium; an additional resistance introduced into an electrical circuit in series with the above mentioned portion of the carrying medium, etc. In this case for realization of the inventive method, the magneto-hydrodynamic pump must be additionally provided with a special device or "parametric modulator" for the given dynamic periodic change of the value of the selected one (from the above mentioned) parameter. In some cases for performing the modulation it is possible to use the combination of several types of such parameters for providing a more complicated law of the modulation.

In such "energy" systems, the optimization of control of the modulation is also connected with the use of some of the controlled characteristics, which reflect the process of transporting of the object with the flow of carrying medium. In some of these systems, as specified herein above (with consideration of their specifics), as the controlled characteristic it is possible to use values of a parameter which characterizes the process of conversion of the energy of movement of the flow of the carrying medium with a transporting object, into another type of energy during their interaction (or without interaction) with an additional source of energy which acts on the flow during the process of transporting. These systems can include various "beam" systems of conversion of energy; gas flow systems with the use of a magneto-hydrodynamic generator, etc. The efficiency of use in such "energy" systems of the proposed inventive method can be connected with the increase of the converted (into other type) energy, and also with the increase of parameters characterizing its quality. The latter is determined by a possibility of minimization of influence on the process of conversion of turbulent factors and also by the dynamic nature of movement of the flow.

At the same time this approach to provide the modulation of the use of various types of the special devices of "parametric modulator" can be efficiently used in some of the above mentioned systems which have the pressure drop means as the action means. In this case as the changing parameter it is possible to use for example: electrical, electromagnetic, magnetic, technical, physical, chemical, physical-chemical parameters or a combination of several of these or other parameters. The parameter (parameters) can be selected with the consideration of the type of the supplied energy and the principle of action of the pressure drop means. This can be a functionally-structural or energy parameter which is connected dynamically with the process of conversion of the supplied energy into the action and significantly directly acting on the process of conversion (with its given change). The function of the "parametric modulator" can be realized in various dynamic control devices which provide the possibility of the given dynamic periodic change of the value of the selected "modulated" parameter, for example with the use of dynamic electromagnetic coupling, on the basis of special modulators of "position" of functional structural elements of the action means, or special modulators of its main energy parameters, etc. Therefore, the above mentioned approach with the use of various types of the special devices of "parametric modulator" as a methodological solution in performing of the modulation of the value of the action, can be used also in various action means of dynamic systems of transporting of the object by the created flow of carrying medium.

The above mentioned analysis of examples of possible efficient use of the proposed method convincingly illustrates the common most characteristic decisive and distinctive features of the present invention. They include the performance of a controlled given modulation of the value of the action in the action means so that the whole dynamically created flow of carrying medium moves with a given dynamic periodically changing sign-alternating acceleration, to provide optimization of energy parameters of the process of transporting of the object with a given dependency from changes of a controlled characteristic, connected with the process of transporting. The optimal dynamic modulation control by "flow-forming" dynamic energy action determines the energy and exploitation efficiency of the process of transporting of the object by the flow of carrying medium.

In turn the above mentioned advantages of the proposed inventive method (new method of dynamic energy-saving optimization control of conveying fluid) open wide possibilities to create a principally new class of energy-saving dynamically controlled systems which provide efficient energy and exploitation characteristics of various processes of transporting of objects by a dynamic flow of carrying medium which is created and controlled by them. This reflects the possibility of a transition of the traditional processes of transporting to a qualitatively new step of their development. This step of development will be characterized by a wide use of the energy-saving dynamic technologies connected with the above mentioned "flow-forming" dynamic energy actions on the carrying medium, and also with dynamic, multi-parameter control which uses a current control of dynamic characteristics of such processes of dynamic transporting of various objects by a created flow of carrying medium.

It will be understood that each of the elements described above, or two or more together, may also find a useful application in other types of methods and devices differing from the types described above.

While the invention has been illustrated and described as embodied in a method of dynamic transporting of object with flow of carrying, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

The invention claimed is:

1. In a conveyor, comprising a cyclic drive means transporting a carrying medium having at least one object entrained therein through an enclosed passage, said drive means interposed between upstream and downstream segments of said passage and comprising a first working zone in a negative drive cycle and a second working zone in a positive drive cycle; a method of optimizing at least one value of said object entrained carrying medium characteristic of said transporting of said object entrained carrying medium with respect to drive means energy consumption comprising:

providing at least one shunt passage from said second working zone to said first working zone;

flowing said object entrained carrying medium through said shunt passage from said second working zone to said first working zone thereby changing said at least one value of said object entrained carrying medium and the difference in magnitude between said cycles;

modulating the flow through said shunt passage to optimize said at least one value with respect to drive means energy consumption, wherein said object is a fluid medium and performs a function of said carrying medium.

2. The method of optimizing of claim 1, wherein said modulating comprises frequency modulation.

3. The method of optimizing of claim 1, wherein said modulating comprises amplitude modulation.

4. The method of optimizing of claim 1, wherein said modulating comprises a standing wave input.

5. The method of optimizing of claim 4, wherein said standing wave modulation is achieved by modulating the geometry of a minimum cross section of said shunt passage.

6. The method of optimizing of claim 1, wherein said modulating comprises a parametric input.

7. The method of optimizing of claim 1, wherein said modulating comprises discrete input.

8. The method of optimizing of claim 1, wherein said drive means comprises a displacement means.

9. The method of optimizing of claim 8, wherein said displacement means comprises a pressure drop.

10. The method of optimizing of claim 1, wherein said object is in turbulent flow.

11. The method of optimizing of claim 1, wherein said shunt passage comprises a filter.

12. A method of dynamic transporting of an object with a flow of a carrying medium, comprising the steps of:

applying to a carrying medium an action which is created in an action means during a process of a conversion of an energy supplied to the action means so that a flow of said carrying medium created in this way acts on an object for providing a process of its transporting in a given direction; and performing a given modulation of a value of said action in said action means, includes providing a given dynamic periodic change of a value of at least one parameter which is dynamically connected with a process of conversion in the action means of said energy supplied to it into said action, with a simultaneous given change of said value of said parameter in each period of its change during said process of transporting of said object, to provide a given dynamic periodic change of said value of said action on said carrying medium, so that said flow of said carrying medium which is created dynamically moves with a given dynamic periodically changing sign-alternating acceleration during a process of transporting of said object, wherein said modulation of said value of said action in said action means includes introduction of values of its parameters selected from a group consisting of a frequency, a range and a law of a dynamic periodic change of said value of said action during said process of transporting of said object.

13. The method of claims 12, wherein said object is a fluid medium and performs a function of said carrying medium.

14. The method of claim 12, wherein said object is structurally not connected with said action means during said process of transporting.

15. The method of claim 12, wherein said object is structurally connected with said action means during said process of transporting.

16. The method of claim 12, wherein said action means is formed as a means for a direct energy action.

17. The method of claim 12, wherein said action means is formed as a pressure drop means.

18. The method of claim 12, wherein said object has a structural part which performs a function of a converting element to provide said process of conversion of said energy supplied to said structural part and generated during a forced interaction of said structural part of said object with said medium which is a flowing medium.

19. The method of claim 12; and further comprising changing a value of at least one of said parameters of said modulation in dependence on a change of at least one characteristic to be controlled, which is connected with said process of transporting of said object, to energy optimize at least one parameter which is connected with said process of transporting.

20. The method of claim 19; and further comprising using as said control characteristic, of values of at least one of parameters of conversion of energy of movement of said flow of carrying medium into another type of energy during said process of transporting.

21. The method of claim 12, wherein said action means is formed as an explosive action means.

* * * * *